Patented Dec. 29, 1936

2,065,718

UNITED STATES PATENT OFFICE 2,065,718

PRODUCT FOR USE IN ROENTGENOGRAPHY AND PROCESS OF PREPARING IT

Thomas O. Menees and J Duane Miller, Grand Rapids, Mich., assignors to The Union Benevolent Association, East Grand Rapids, Mich., a non-profit corporation of Michigan No Drawing. Application July 16, 1934,
Serial No. 735,426

4 Claims. (Cl. 167—95)

Our invention relates to roentgenoscopy and roentgenography, and is primarily concerned with the production of a preparation which is suitable for use within the human body and which, by reason of its opacity to X-rays, will effectively delineate surfaces upon which it is deposited. We are aware that substances opaque to X-rays have been used before in making roentgenoscopic and roentgenographic examinations of the human body, a notable example being the use of barium compounds, administered orally, in making X-ray examinations of the gastro-intestinal tract. Such methods have the disadvantage that the organ to be examined must be filled with the opaque substance, and the resultant internal pressure may cause such distension or distortion as will obscure or completely obliterate evidence of a condition which in fact exists and which it is the purpose of the examination to disclose.

The material which it is the primary object of our invention to produce need not result in any distortion or distension because it may be deposited on the surfaces being examined and need not completely fill the space which such surfaces define. Obviously, any such substance intended for use in the human body should be non-toxic and non-irritating.

In carrying out our invention, we employ an aqueous suspension of thorium hydroxide, the concentration of the suspension depending upon the use to which it is to be put. To stabilize such a suspension, and to increase its fluidity where that characteristic is deemed desirable, we may add to the suspension a peptizing agent in the form of a water-soluble, strong-acid thorium salt such as thorium nitrate or thorium chloride. When a suspension of thorium hydroxide in water, with or without an added peptizing agent, is brought into association with blood-serum, mucus, or colloids such as gelatin or mucin, or with alkalies, we find that the thorium hydroxide will be deposited.

We prefer to make the thorium hydroxide used in our preparation by precipitating it with ammonium carbonate from a water solution of a relatively soluble thorium salt, such as thorium nitrate or thorium chloride. The amount of ammonium carbonate added to the solution of the thorium salt may be slightly more than that theoretically necessary to react with the thorium nitrate in order to insure complete precipitation.

The precipitated thorium hydroxide is permitted to settle, and the clear supernatant liquid is then poured off. The precipitate is then washed by adding to the retained liquid several volumes of water, shaking, permitting the thorium hydroxide to settle, and again decanting. This washing operation is repeated five or six times.

We prefer to precipitate the thorium hydroxide from a thorium solution which is relatively dilute—say in the neighborhood of 1% or less. The thorium hydroxide is precipitated in larger particles from dilute solutions than from more concentrated solutions, the larger particles settle more quickly, and thus the original precipitation and the washing operations are expedited. We also find it an advantage to boil for a few moments the residue which remains from the original precipitation in order to expel carbon dioxide. This operation speeds up settling of the thorium hydroxide following each washing.

After the thorium hydroxide has been thoroughly washed, the peptizing agent is added to the residue from the last decantation, and the resultant product is evaporated to the desired concentration. The concentration of thorium hydroxide in the final product may range from 60%, which is satisfactory if the product is to be used in sinuses in soft tissue, down to 30%, suitable for uterine injection, or even to lower concentrations for use in the colon. Suspensions of 5% concentration have given good outlines of the colon.

The peptizing agent which we prefer to use is thorium nitrate, although any other strong-acid, water-soluble salt of thorium, such as thorium chloride, will serve equally well. The amount of the thorium nitrate used will depend upon the concentration in the finished product. For most uses, where the thorium hydroxide constitutes about 20% to 40% of the finished product, the thorium nitrate concentration may be in the neighborhood of 1% to 2%. A thorium nitrate concentration of 1% will generally be found sufficient if the thorium hydroxide was thoroughly washed after its precipitation; but where such washing has been inadequate, a greater quantity of the peptizing agent may have to be used in order to neutralize the ammonium carbonate retained as the result of the inadequate washing. Where the thorium hydroxide concentration of the solution is higher than that just mentioned, say in the neighborhood of 60%, as much as 3% of the peptizing agent may be necessary.

In general, the fluidity of the thorium hydroxide suspension can be increased by the addition of a peptizing agent such as thorium nitrate or thorium chloride, and the fluidity of the suspension may therefore be controlled to suit the desired purpose. Fluidity is of course usually desirable where the preparation is to be injected through the use of a syringe, especially if the syringe has a fine needle. Where fluidity is not regarded as a necessary characteristic, the amount of peptizing agent may be cut down, and it may be eliminated completely if the concentration of the thorium hydroxide is great enough to prevent its settling. We have used an unpeptized suspension of thorium hydroxide as a spray in the throat and upper air passages of the head with good results.

The product prepared as above described has been found to be very satisfactory in practice, especially for use in the human body. It has a pH value lying between 6 and 7, and usually in the neighborhood of 6.2, and in its more fluid states it is in the form of a translucent, opalescent liquid. It is therefore not so liable to cause irritation as are preparations which depart to a greater extent from neutrality.

When our product is brought into contact with surfaces normally covered with alkaline or mucous secretions, thorium hydroxide will be deposited on such surfaces. In cases where the surface of the organ to be examined is not covered with a secretion which will cause the suspended thorium hydroxide to be deposited, the surface may be first washed with gelatin, mucin, or some other substance capable of precipitating thorium hydroxide from an aqueous suspension thereof. The undeposited thorium hydroxide remains in the suspension, which may be removed; the deposited film being sufficiently opaque to X-rays to delineate the surface with which it is in contact. This makes it possible to examine organs of the human body in their normal undistended state. Further, when our preparation is applied to the surface only of an organ to be examined there is definition of detail over the entire area of the shadow; whereas, when the organ is completely filled with an X-ray opaque substance, the body of the substance casts so dense a shadow that definition of detail exists only at the edges.

While, as pointed out above, our preparation may be used merely to coat the surface of an organ or body cavity to be examined, a thorium hydroxide suspension, with or without an added peptizing agent, may be employed to fill the organ or cavity completely, if that procedure is deemed desirable.

We claim as our invention:

1. A preparation for creating X-ray shadows when applied to the walls of the cavities or internal organs in the human body, comprising an aqueous suspension of thorium hydroxide and a peptizing agent.

2. A preparation for creating X-ray shadows when applied to the walls of the cavities or internal organs in the human body, comprising an aqueous suspension of thorium hydroxide and a water-soluble, strong-acid salt of thorium.

3. A preparation for creating X-ray shadows when applied to the walls of the cavities or internal organs in the human body, comprising an aqueous suspension of thorium hydroxide and thorium nitrate.

4. A preparation for creating X-ray shadows when applied to the walls of the cavities or internal organs in the human body, comprising an aqueous suspension of thorium hydroxide.

THOMAS O. MENEES.
J DUANE MILLER.